(12) United States Patent
Pogue

(10) Patent No.: US 6,244,518 B1
(45) Date of Patent: Jun. 12, 2001

(54) SNAKE REPELLENT SYSTEM

(76) Inventor: Thelma F. Pogue, 4414 S. 3rd St., Phoenix, AZ (US) 85040

( * ) Notice: Subject to any disclaimer, the term of this patent is extended or adjusted under 35 U.S.C. 154(b) by 0 days.

(21) Appl. No.: 09/416,582

(22) Filed: Oct. 12, 1999

(51) Int. Cl.$^7$ .................................................. A61L 9/04
(52) U.S. Cl. ........................ 239/36; 239/54; 239/55; 239/57; 239/58; 239/59; 239/60; 215/204; 215/209; 220/253
(58) Field of Search ........................... 239/34, 36, 54, 239/55, 57, 58, 59, 60, 152; 215/204, 209, 211, 214, 217, 219, 221; 220/253, 255, 281

(56) References Cited

U.S. PATENT DOCUMENTS

| | | | | |
|---|---|---|---|---|
| 1,732,028 | * | 10/1929 | Reiner | 239/36 |
| 2,138,040 | * | 11/1938 | Perry | 239/57 X |
| 3,595,417 | * | 7/1971 | Musher | 215/209 X |
| 3,625,387 | * | 12/1971 | Schaefer | 215/209 X |
| 4,036,385 | * | 7/1977 | Morris | 215/209 |
| 4,455,304 | * | 6/1984 | Yaralian | 424/195 |
| 4,602,384 | * | 7/1986 | Schneider | 2/2 |

FOREIGN PATENT DOCUMENTS 298 02 237 U * 7/1998 (DE).

* cited by examiner

*Primary Examiner*—David A. Scherbel
*Assistant Examiner*—Robin O. Evans
(74) *Attorney, Agent, or Firm*—Martin L. Stoneman

(57) ABSTRACT

A snake repellent system for use in repelling snakes so as to prevent the human user from being bitten. The snake repellent system consists of a receptacle into which is placed a quantity of garlic or onion, the aroma of which is believed to be effective in repelling snakes. The receptacle is provided with a lid having a plurality of openings for facilitating the dispersal of the garlic or onion aroma. The receptacle may be provided with a mincing rack used to mince a clove of garlic, thereby more fully releasing its aroma. The receptacle may also be provided with a means to both limit child access to the repellent substance within the receptacle and prevent removal of the repellent substance from the lid openings. An adjustable band is provided for attaching the receptacle to the arm or leg of the user.

2 Claims, 2 Drawing Sheets

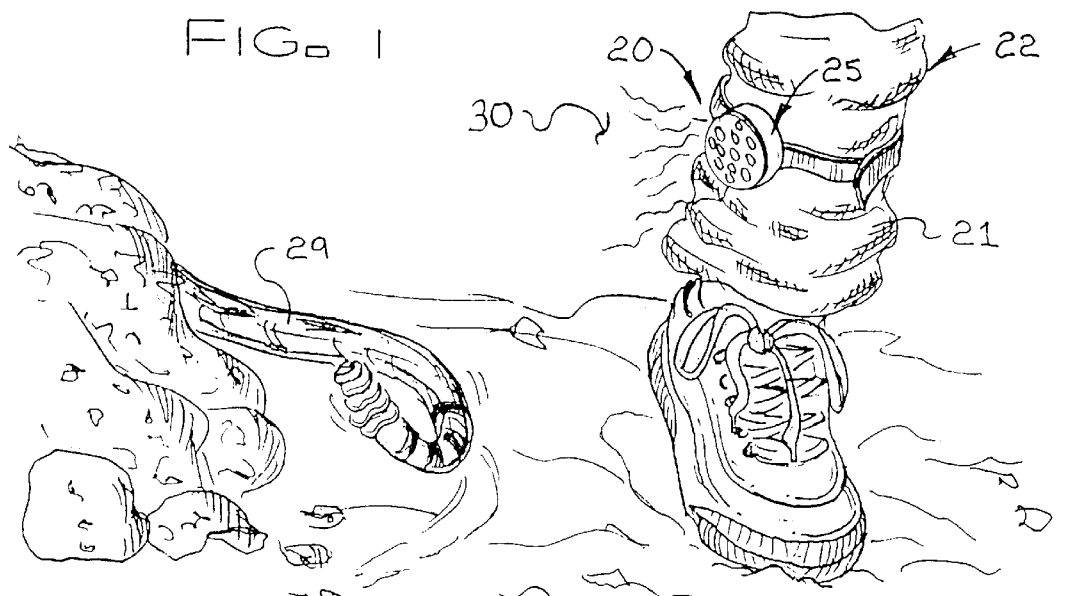
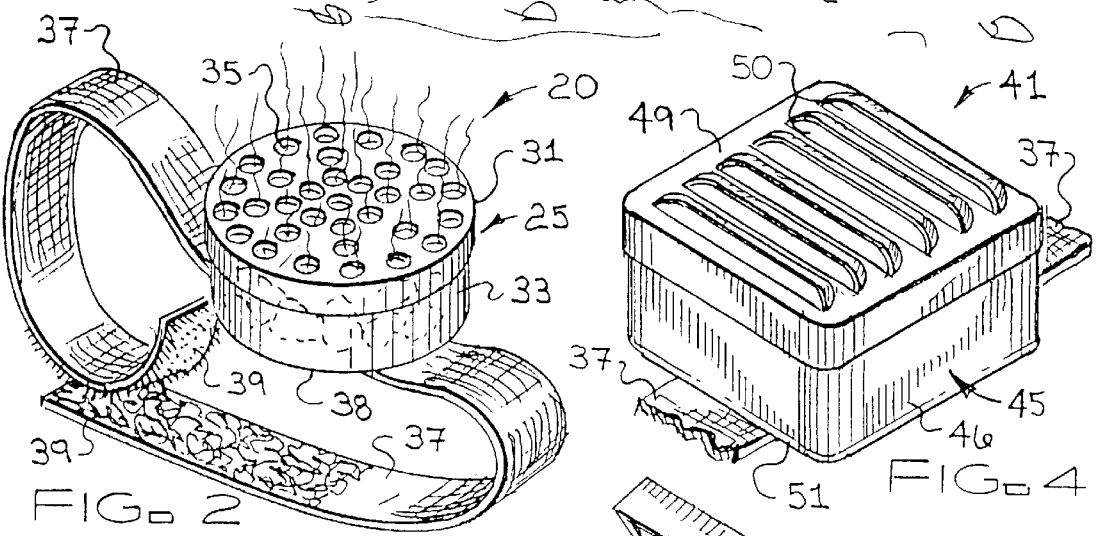
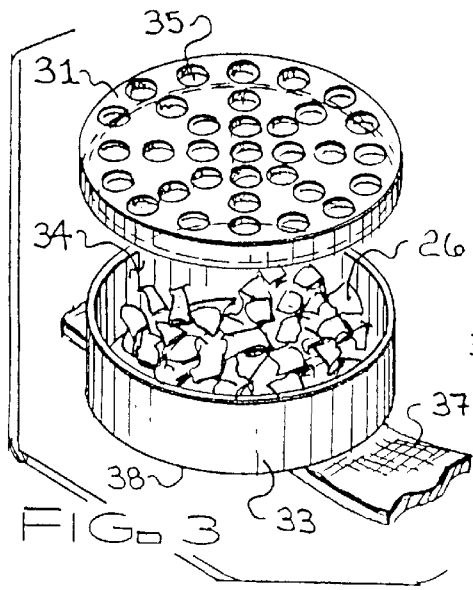
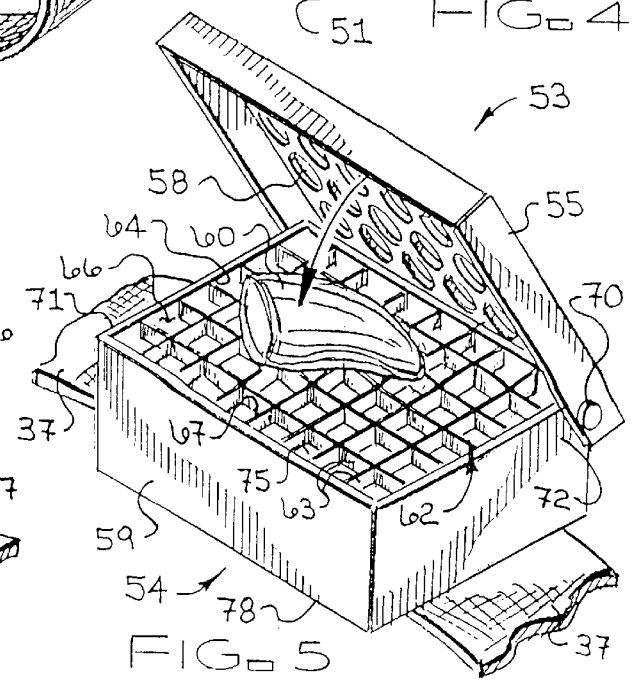

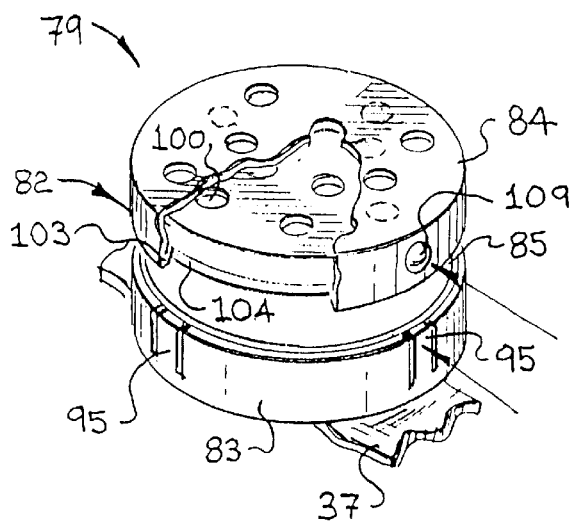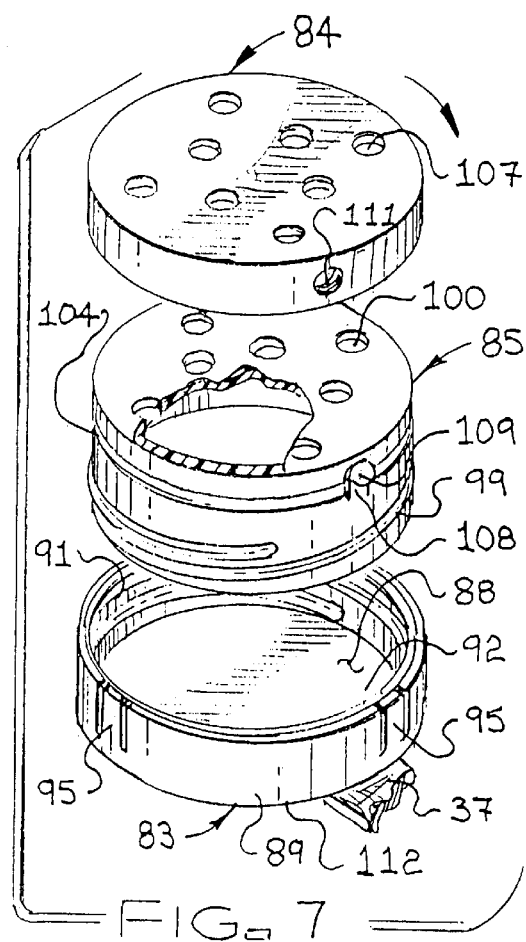

SNAKE REPELLENT SYSTEM

BACKGROUND OF THE INVENTION

1. Field of the Invention

This invention relates to providing a snake repellent system. More particularly, this invention concerns a snake repellent system which may be worn or otherwise carried by the user and in which may be stored substances which are believed to be effective in repelling snakes.

2. Description of the Prior Art

Typically, many varieties of snakes respond to environmental stimuli by sampling the odors in the air with their tongues. From this sampling process, the snake may recognize whether the object in question is a threat or prey; and it reacts accordingly, either fleeing to a safe location, remaining still, or moving closer in hopes of receiving a meal. Of those varieties of snake which taste environmental stimuli by using the tongue, certain species such as the rattlesnake contain venom which can seriously injure, disfigure, or even kill an adult human if bitten. The risk of death greatly increases if such a snake bites a small child. Considering the fact that humans and rattlesnakes share the environment in which they live and very often encounter each other, the chance of a fatal encounter likewise increases as humans increasingly continue to encroach into the environment occupied by such snakes. Species such as rattlesnakes typically do not view humans as prey and will attempt to flee or, if given time, warn the human by rapidly vibrating the bony segments of its tail to produce a distinct rattling sound. However, a sudden encounter between the snake and the human may not afford the snake the opportunity to warn the human prior to striking. In addition, small children and pets may not perceive the risk posed by the snake and may approach the rattling sound out of curiosity.

A number of methods are available to protect adults and children from being bitten by a snake. One such method includes the use of specially-made garments which are designed to form a protective barrier between the fangs of a snake and the wearer's skin. These garments may either comprise a full boot in which the sides of the boot extend substantially to the wearer's knees, or a legging-type garment which is attached to each of the wearer's legs and extends from the shoe to the knee. Both garments typically are made of leather having a sufficient toughness and thickness to prevent the penetration of the snake's fangs into the skin. Although both products are instrumental in preventing injury due to snakebites, both may be toq cumbersome and expensive for many users. In addition, covering part of the leg with thick leather may make traversing through hot environments uncomfortable and interfere with the tanning process for those who venture outdoors with exposed legs in hopes of improving their tan. Furthermore, neither product is proactive in preventing the shock and fright associated with having a snake actually strike at one's body.

Yet further, in many areas, most particularly of the southwest United States, construction of new homes is taking place nearby occupied homes. Such construction tends to disturb and make more active the snakes, most particularly rattlesnakes, which are indigenous to that area. This puts children and pets playing outdoors, even in their own nearby yards, at higher risk. And it is expensive, inefficient, and difficult to make children consistently wear cumbersome snake protection of the type above mentioned.

Thus, none of the prior art referred to herein will accomplish the purpose of the present invention.

OBJECTS OF THE INVENTION

A primary object of the present invention is to fulfill the above-mentioned need by the provision of a snake repellent system. A further primary object of the present invention is to provide such a system which is efficient, inexpensive, easy to use, and easy to manufacture. A still further primary object of this invention is to provide such a system which is environmentally safe and safe for the user. Other objects of this invention will become apparent with reference to the following invention descriptions.

SUMMARY OF THE INVENTION

According to a preferred embodiment of the present invention, this invention provides a snake repellent system, for using a repelling means for producing a snake repelling aroma, comprising, in combination: a substantially-rigid receptacle means for receiving and holding the repelling means; and an attachment means, attachable to such receptacle means, for attaching such receptacle means to the user; wherein such receptacle means comprises escape means for permitting the snake repelling aroma to escape from such receptacle means. And, it provides such a snake repellent system wherein such escape means comprises at least one aperture in such receptacle means. This invention further provides such a snake repellent system further comprising entry-inhibiting means for inhibiting unauthorized entry into such receptacle means; and, wherein such escape means comprises user-closing means for stopping the snake repelling aroma from escaping from such receptacle means.

In addition, this invention provides such a snake repellent system wherein such receptacle means comprises: a base portion having a chamber structured and arranged for receiving the repelling means; and a lid portion attachable to such base portion; and, wherein such lid portion comprises at least one lid aperture; and, further still, wherein such lid aperture comprises a louver opening. Further, this invention provides such a snake repellent system further comprising a mincing means for mincing the repellent means into such chamber. And, further still, this invention provides such a snake repellent system wherein: such chamber is bounded by at least one chamber wall having an upper chamber wall portion; and wherein such mincing means comprises a plurality of elongated members overlying such chamber adjacent such upper chamber wall portion. And, it provides such a snake repellent system wherein such base portion and such lid portion each comprise at least one planar portion which is substantially round.

Additionally, it provides such a snake repellent system further comprising entry-inhibiting means for inhibiting unauthorized entry into such receptacle means; and, wherein such entry-inhibiting means comprises: a substantially circular threaded member concentrically disposed within such chamber and rotatably attached to such base portion; a rotation-prevention means, attached to such base portion, for substantially preventing rotation of such threaded portion when such rotation-prevention means is engaged; and a threaded side portion, provided on such lid portion, structured and arranged to engage such threaded member. And, this invention provides such a snake repellent system wherein such rotation prevention means comprises at least one resilient tab. Further still, this invention provides such a snake repellent system further comprising a cap portion rotatably attached to such lid portion; and, further still, wherein such cap portion comprises: at least one cap aperture which, when such cap portion is rotated into an open position, is substantially aligned with such lid aperture; and at least one cap aperture which, when such cap portion is rotated into a closed position, does not overlap any such lid aperture.

Even further, this invention provides such a snake repellent system further comprising a rotation locking means for preventing unauthorized rotation of such cap portion to such open position; and, wherein such rotation locking means comprises: a resilient tab formed on such lid portion; and a button attached to such tab, such button being structured and arranged to engage an opening provided in such cap portion when such cap portion is in such closed position. Furthermore, this invention provides such a snake repellent system wherein such base portion and such lid portion each comprise at least one planar portion which is substantially square. And, further still, it provides such a snake repellent system wherein such attachment means comprises a strap; and, yet further still, wherein such attachment means comprises adjustment means for adjusting the girth of attachment. And, it provides such a snake repellent system wherein such adjustment means comprises a hook-and-loop fastener.

Even further, in accordance with a preferred embodiment thereof, this invention provides for a snake repellent system for repelling snakes from a user, comprising, in combination: a repelling means for producing a snake repelling aroma; a substantially-rigid receptacle means for receiving and holding such repelling means; an attachment means, attachable to such receptacle means, for attaching such receptacle means to the user; wherein such receptacle means comprises escape means for permitting such snake repelling aroma to escape from such receptacle means. And, it provides for such a snake repellent system wherein such repelling means is a substance selected from the group consisting of garlic and onion.

Yet further still, in accordance with a preferred embodiment thereof, this invention provides for a snake repellent system for repelling snakes from a user comprising, in combination: a repellent substance selected from the group consisting of garlic and onion; a receptacle for containing such repellent substance, such receptacle comprising: a base portion having a chamber structured and arranged for receiving such repellent substance, and a lid portion attached to such base portion; and an adjustable strap structured and arranged to attach such receptacle to the user; wherein such lid portion comprises at least one lid aperture structured and arranged for permitting an aroma to escape from such receptacle.

BRIEF DESCRIPTION OF THE DRAWINGS

FIG. 1 is a view of the snake repellent system in use by the user in its working environment.

FIG. 2 is a perspective view of a preferred embodiment of this invention.

FIG. 3 is an exploded perspective view of the preferred embodiment of FIG. 2.

FIG. 4 is a perspective view illustrating another preferred embodiment of this invention.

FIG. 5 is a perspective view illustrating yet another preferred embodiment of this invention.

FIG. 6 is a perspective view illustrating yet still another preferred embodiment of this invention.

FIG. 7 is an exploded perspective view of the embodiment shown in FIG. 6.

DETAILED DESCRIPTION OF A PREFERRED EMBODIMENT AND THE BEST MODE OF PRACTICE

Referring now to the drawings, shown in perspective in FIG. 1 is a preferred embodiment of the snake repellent system 20 of the present invention attached to the leg 21 of the user 22 (or, similarly, a neck of a pet, not shown). As will be described in more detail as this disclosure progresses, the snake repellent system 20 comprises a receptacle 25 for receiving a quantity of a repellent substance 26 (as shown best in FIG. 3) that applicant believes is effective in repelling those snakes 29 that the user 22 may encounter when traversing through areas where snakes may be located. It is highly preferred that the repellent substance 26 (embodying herein repelling means for producing a snake repelling aroma) comprise a natural substance consisting of either garlic or onion, both of which produce a particular aroma 30 which alerts and repels the snake 29 before the user 22 comes within the snake's 29 striking distance.

Referring now to FIGS. 2 and 3, the details of the preferred embodiment of the snake repellent system 20 will now be discussed. As shown in the FIG. 2 perspective view, the snake repellent system 20 comprises a receptacle 25 that is preferably substantially circular (in plan view) in shape having a preferred diameter of about 1½ inches. All receptacle embodiments described herein embodies herein a substantially-rigid receptacle means for receiving and holding the repelling means. To withstand impact with outdoor hazards like brush, rocks, or the like, it is preferred that the receptacle 25 comprise a substantially rigid material such as plastic or metal. As shown in the exploded view of FIG. 3, the receptacle 25 further comprises a removable lid 31 which, when removed from the base portion 33, exposes a chamber 34 into which is placed the repellent substance 26. It is preferred that in order to maintain the lid 31 on the base portion 33 during use (even in an effective "child-proof" way), the lid 31 be sized to provide a snug friction fit on base portion 33. To facilitate the dispersal of the repelling aroma 30, the lid 31 is provided with a plurality of apertures 35 each of which are preferably sized to prevent the accidental loss of the repellent substance 26 from the chamber 34 when the snake repellent system 20 is in use. All lid apertures disclosed herein embody herein escape means for permitting the snake repelling aroma to escape from such receptacle means; and, wherein such escape means comprises at least one aperture in such receptacle means. The illustrated round shape is particularly suited for holding onion slices, as well as efficient manufacture and efficient closure systems.

Referring further to FIGS. 2 and 3, the snake repellent system 20 is further provided with a band 37 which is preferably structured and arranged to encircle the leg 21 or arm (not shown) of the user 22. As in these drawings, band 37 is preferably adhesively attached to the bottom surface 38 of the base portion 33, although other methods such as rivet-type attachments or other types of mechanical fasteners may also be employed. The band 37 may be made of any suitable resilient material such as leather, plastic, cloth, or the like, and it is preferred that the band 37 be adjustable to allow for attachment to those appendages of varying sizes and shapes or which may be covered by clothing of various thicknesses. The band 37 embodies herein an attachment means, attachable to such receptacle means, for attaching such receptacle means to the user. Band 37 adjustability may be accomplished by various well-known methods such a providing an elastic unitary band, providing buckles, or, preferably, providing the band 37 with well-known hook-and-loop type fasteners 39, as shown. The hook-and-loop fasteners 39 embody herein adjustment means for adjusting the girth of attachment, e.g., around the neck of a pet or leg of a child.

Shown in perspective in FIG. 4 is one alternate preferred embodiment of the snake repellent system of the present invention designed hereinafter by reference numeral 41. In this alternate embodiment of this invention, the receptacle 45 is preferably substantially square in shape (in a plan view), having preferred dimensions approximately equivalent size-wise to the preferred size of the previously-described "round" embodiment, and also preferably made of a substantially rigid material. Frictionally attached to the base portion 46 is the lid 49. As shown, the lid 49 preferably comprises a plurality of louver-type openings 50 designed to facilitate the dispersal of the aroma 30 from the repellent substance 26 contained within the receptacle chamber (not shown). Also provided is a band 37, substantially as illustrated and described previously with respect to FIG. 2, which also may be attached to the bottom surface 51 of the base portion 46 by an adhesive attachment, mechanical fasteners, or other like methods.

Shown in FIG. 5 is yet another alternate preferred embodiment of this invention designated herein as snake repellent system 53. Shown is a receptacle 54 preferably having a substantially rectangular shape with a preferred length of about 1½ inches and a preferred width of about 1 inch. The receptacle 54 is also provided with a lid 55, having a plurality of apertures 58, which is frictionally held to the base portion 59 when the lid 55 is in a closed position. To assist in mincing a garlic clove 60 so as to fully release its aroma 30, a mincing rack 62 (comprising a plurality of interconnected elongated members 63, as shown) is attached, preferably integrally, adjacent the upper wall portions 64 of chamber 66. This arrangement embodies herein an arrangement wherein such mincing means comprises a plurality of elongated members overlying such chamber adjacent such upper chamber wall portion. To more easily mince the clove 60 without placing undue stress on or otherwise breaking the mincing rack 62, it is preferred that the mincing rack 62 comprise a substantially tough and rigid material, preferably metal. In addition, it is preferred that the top edges 67 of mincing rack 62 comprise sharp edges to more easily mince the clove 60. The mincing rack 62 embodies herein a mincing means for mincing the repellent means into such chamber.

In use, the lid 55 is opened by use of hinge pins 70 pivotally connecting the lid 55 to the respective upper left and right sides 71 and 72 of base portion 59. If the user desires, a whole garlic clove 60 is then placed on the top edges 67 of the mincing rack 62 and the lid 55 swung down with pressure sufficient to mince the clove 60, thereby allowing the minced clove pieces to fall through the rack openings 75 and into the chamber 66. The user may also use the present embodiment of this invention with pre-minced garlic or onion by simply dropping the minced pieces directly through the rack openings 75 and into the chamber 66. To withstand the pressure required to fully mince the clove 60, it is preferred that the hinge pins 70 comprise a tough and durable material, such as a metal material. Also shown is the use of a band 37, as substantially illustrated and described previously, for use in attaching the snake repellent system 53 to the arm or leg of the user. The band 37 may also be attached to the bottom surface 78 of the base portion 59 by an adhesive, preferably, or mechanical fasteners, or other like methods.

Shown in FIGS. 6 and 7 are, respectively, a partial cut-away view in perspective and an exploded view of yet still another alternate preferred embodiment of the present invention designated hereinafter by reference numeral 79. As shown, the present alternate embodiment of the snake repellent system 79 is provided with a substantially planar round receptacle 82 (as shown) comprising a base portion 83, a cap portion 84, and a lid portion 85. With reference to FIG. 7, to prevent small children from accessing the contents within the chamber 88, the base portion 83 comprises an outer shell portion 89 and an inner substantially circular threaded member 91 which is structured and arranged (as shown) to sit atop the chamber bottom portion 92 and to rotate freely thereon, as will be readily understood by those skilled in the arts of "childproofing" (and embodying herein an entry-inhibiting means for inhibiting unauthorized entry into such receptacle means). In further detail, to prevent the inner threaded member 91 from becoming separated from the chamber 88, the inner threaded member 91 is provided with a rib (not shown) that is structured and arranged to engage a corresponding groove (not shown) formed on the base portion 83. Attachment of the lid portion 85 to the base portion 83 consists of the user using his or her fingers to apply pressure to the resilient tabs 95, which are preferably integrally formed on outer shell portion 89, thereby frictionally preventing rotation of the inner threaded member 91 during the attachment procedure. The tabs 95 embody herein a rotation-prevention means, attached to such base portion, for substantially preventing rotation of such threaded portion when such rotation-prevention means is engaged. Next, the threaded side portion 99 of lid portion 85 is engaged, in well-known ways, with the inner threaded member 91, thereby allowing the lid portion 85 to be snugly attached to base portion 83. Removal of the lid portion 85 consists of simply again applying a pressure to the tabs 95 sufficient to prevent rotation of the inner threaded member 91, and un-screwing the lid portion 85, in well-known ways. As will be appreciated by those skilled in such art, by requiring that pressure be applied to tabs 95 in order to remove the lid portion 85, small children are prevented from obtaining access to the repellent substance 26 contained within the chamber 88.

Referring further to FIGS. 6 and 7, the details of the cap portion 84 will now be discussed. As will become apparent to those skilled in such art, the cap portion 84, when structured and arranged in the manner described herein, may both seal in the aroma 30 of the repellent substance 26 when the snake repellent system 79 is not in use and also then prevents accidental removal of the repellent substance 26 through the lid apertures 100. The cap portion 84 preferably comprises a plastic material having a circumferential lip portion 103 structured and arranged to engage, in well-known ways, a circumferential ridge 104 provided on lid portion 85. When the cap portion 84 is attached to the lid portion 85 in the manner herein described, the cap portion 84 is prevented from being separated from the lid portion 85 while remaining free to rotate thereon. As is further shown, the cap portion 84 is provided with a plurality of cap apertures 107 which are structured and arranged to substantially match the pattern of the lid apertures 100 provided on the lid portion 85 when the cap portion 84 is in the "open position" (see FIG. 7). As used herein, "open position" refers to substantial alignment between apertures 100 and 107, thereby providing for unobstructed release of the aroma 30 from the repellent substance 26 contained within chamber 88. To both substantially seal the aroma 30 within the chamber 88 and prevent accidental removal of the repelling substance by a child, the user simply rotates the cap portion 84 to the "closed position" (see FIG. 6) defined as that position in which none of cap apertures 107 overlap lid apertures 100. This arrangement embodies herein an arrangement wherein such escape means comprises user-closing means for stopping the snake repelling aroma from escaping from such receptacle means.

To prevent child tampering or accidental opening of the cap portion 84 when the snake repellent system 79 is not in use, a means is provided for securing the cap portion 84 in a closed position. As shown, the lid portion 85 is provided with a resilient tab 108 having an integral button 109 formed thereon. The button 109, in turn, is structured and arranged to engage a corresponding opening 111 provided on cap portion 84 when the cap portion 84 is rotated to the closed position. When so engaged, the cap portion 84 is effectively prevented from being rotated to the open position. Releasing the cap portion 84 consists of simply applying a pressure to the button 109 sufficient to dislodge the button 109 from opening 111, thereby allowing for rotation of cap portion 84. In addition, if desired, to effectively lock the cap portion 84 in the open position so as to prevent accidental closing of the cap portion 84 when the snake repellent system 79 is in use, an additional tab/button arrangement (not shown) may be provided on the lid portion 85 to cooperate with a corresponding second opening (not shown) provided on cap portion 84. The tab 108 and button 109 arrangement described above embodies herein a rotation locking means for preventing unauthorized rotation of such cap portion to such open position. Also shown is the use of a band 37, as substantially illustrated and described previously, for use in attaching the snake repellent system 79 to the arm or leg of the user. The band 37 is attached to the bottom surface 112 of the chamber bottom portion 92 by an adhesive (preferably), mechanical fasteners, or other like methods.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A snake repellent system, for using a repelling means for producing a snake repelling aroma, comprising, in combination:
   (a) a substantially-rigid receptacle means for receiving and holding the repelling means; and
   (b) an attachment means, attachable to such receptacle means, for attaching such receptacle means to the user;
   (c) wherein such receptacle means comprises escape means for permitting the snake repelling aroma to escape from such receptacle means;
   (d) wherein such receptacle means comprises
      (i) a base portion having a chamber structured and arranged for receiving the repelling means, and
      (ii) a lid portion attachable to such base portion; and
   (e) wherein such base portion and such lid portion each comprise at least one planar portion which is substantially round; and
   (f) a cap portion rotatably attached to such lid portion;
   (g) wherein such cap portion comprises
      (i) at least one cap aperture which, when such cap portion is rotated into an open position, is substantially aligned with such lid aperture, and
      (ii) at least one cap aperture which, when such cap portion is rotated into a closed position, does not overlap any such lid aperture; and
   (h) a rotation locking means for preventing unauthorized rotation of such cap portion to such open position.

2. A snake repellent system, for using a repelling means for producing a snake repelling aroma, comprising, in combination:
   (a) a substantially-rigid receptacle means for receiving and holding the repelling means; and
   (b) an attachment means, attachable to such receptacle means, for attaching such receptacle means to the user;
   (c) wherein such receptacle means comprises escape means for permitting the snake repelling aroma to escape from such receptacle means;
   (d) wherein such receptacle means comprises
      (i) a base portion having a chamber structured and arranged for receiving the repelling means, and
      (ii) a lid portion attachable to such base portion; and
   (e) wherein such base portion and such lid portion each comprise at least one planar portion which is substantially round; and
   (f) a cap portion rotatably attached to such lid portion;
   (g) wherein such cap portion comprises
      (i) at least one cap aperture which, when such cap portion is rotated into an open position, is substantially aligned with such lid aperture, and
      (ii) at least one cap aperture which, when such cap portion is rotated into a closed position, does not overlap any such lid aperture; and
   (h) a rotation locking means for preventing unauthorized rotation of such cap portion to such open position;
   (i) wherein such rotation locking means comprises:
      (i) a resilient tab formed on such lid portion; and
      (ii) a button attached to such tab, such button being structured and arranged to engage an opening provided in such cap portion when such cap portion is in such closed position.

\* \* \* \* \*